(12) United States Patent
Toyoyama et al.

(10) Patent No.: US 8,393,767 B2
(45) Date of Patent: Mar. 12, 2013

(54) VEHICLE LIGHT

(75) Inventors: Hideki Toyoyama, Tokyo (JP); Yoshiaki Akiyama, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 250 days.

(21) Appl. No.: 12/785,585

(22) Filed: May 24, 2010

(65) Prior Publication Data

US 2010/0296306 A1 Nov. 25, 2010

(30) Foreign Application Priority Data

May 22, 2009 (JP) ................................ 2009-124534

(51) Int. Cl.
 *F21V 7/00* (2006.01)
(52) U.S. Cl. ......... 362/518; 362/523; 362/545; 362/547
(58) Field of Classification Search .................. 362/516, 362/517, 518, 519, 523, 531, 543, 544, 545, 362/547, 241, 294
See application file for complete search history.

(56) References Cited

U.S. PATENT DOCUMENTS

| 7,618,174 | B2 * | 11/2009 | Yasuda et al. ................. 362/545 |
| 7,959,336 | B2 * | 6/2011 | Iwasaki ......................... 362/517 |
| 2006/0120094 | A1 * | 6/2006 | Tsukamoto et al. .......... 362/518 |
| 2006/0239022 | A1 | 10/2006 | Inaba et al. |
| 2007/0236953 | A1 | 10/2007 | Nakazawa et al. |
| 2009/0154190 | A1 * | 6/2009 | Choi et al. .................... 362/547 |

FOREIGN PATENT DOCUMENTS

| JP | 2006-302711 A | 11/2006 |
| JP | 2007-305575 A | 11/2007 |

* cited by examiner

*Primary Examiner* — Y My Quach Lee
(74) *Attorney, Agent, or Firm* — Kenealy Vaidya LLP

(57) ABSTRACT

A light can be configured by assembling an additional optical system in a lower optical system in a period of time that can be shorter than that of the conventional case. The vehicle light can include a first optical system configured to form a part of a predetermined light distribution pattern, and a second optical system disposed adjacent to the first optical system and configured to form a part of the predetermined light distribution pattern. The second optical system can include a light source, and a reflector including a first reflecting surface, a second reflecting surface, and a third reflecting surface. The reflector can be integrally formed with the first reflecting surface, the second reflecting surface, and the third reflecting surface.

11 Claims, 5 Drawing Sheets

VEHICLE LIGHT

This application claims the priority of benefit under 35 U.S.C. §119 of Japanese Patent Application No. 2009-124534 filed on May 22, 2009, which is hereby incorporated in it entirety by reference.

This application is related to Applicant's co-pending U.S. patent application Ser. No. 12/785,611 filed on the same date herewith, May 24, 2010, and which disclosure is hereby incorporated in its entirety by reference.

TECHNICAL FIELD

The presently disclosed subject matter relates to a vehicle light, and in particular, to a vehicle light including two types of optical systems adjacent to each other.

BACKGROUND ART

A conventional known vehicle light having two types of optical systems adjacent to each other is described in Japanese Patent Application Laid-Open No. 2007-305575, for example. The vehicle light can include an upper optical system and a lower optical system disposed below the upper optical system. In this vehicle light, the irradiating light from the respective upper and lower optical systems can form a predetermined light distribution pattern.

In this type of vehicle light, as the upper optical system is separately provided from the lower optical system, when it is observed from outside, one can see the respective light-emitting areas separately. This means the visibility of the vehicle light by pedestrians may not be optimized and/or may deteriorate.

In order to solve this problem, another vehicle light 200 was devised as disclosed in Japanese Patent Application Laid-Open No. 2007-305575, as shown in FIG. 1. The vehicle light 200 can include an upper optical system 210, a lower optical system 220, and an additional optical system 230 disposed between them. The additional optical system 230 can receive light from either the upper or lower optical system 210 or 220 directly or indirectly (reflected light), to reflect the same to project light. The light-emitting area produced by the additional optical system 230 can connect the light-emitting areas of the upper and lower optical systems 210 and 220, thereby integrating the light-emitting areas of these optical systems as a united light-emitting area for pedestrians.

SUMMARY

In the configuration of the vehicle light disclosed in Japanese Patent Application Laid-Open No. 2007-305575, the lower optical system 220 and the additional optical system 230 are provided as separate components. Accordingly, even a skilled person has no other choice than to separately assemble the lower optical system 220 and the additional optical system 230. This requires a certain knowledge of assembly techniques and manpower. Even when they are assembled properly, there may be slight errors associated with the respective members, thereby accumulating with any assembly errors of the lower optical system 220 and the additional optical system 230.

Furthermore, as they are separately assembled, when the vehicle light is installed in a vehicle body, it may be difficult to adjust the optical axis because of these assembly errors.

Accordingly, it is desired to develop an installation mechanism for installing a vehicle light into a vehicle body without being affected by the component assembly errors.

The presently disclosed subject matter was devised in view of these and other problems and in association with the conventional art. According to an aspect of the presently disclosed subject matter, a vehicle light can be configured by assembling an additional optical system in a lower optical system in a period of time shorter than in the conventional case. In addition to this, assembly errors can be avoided during the assembling of these optical systems.

According to another aspect of the presently disclosed subject matter, a vehicle light can include: a first optical system configured to form a part of a predetermined light distribution pattern, the first optical system having a light-emitting area when observed from outside, and a second optical system disposed adjacent to the first optical system and configured to form a part of the predetermined light distribution pattern, the second optical system having a light-emitting area when observed from outside. The second optical system can include a light source having a light emitting direction, and a reflector including a first reflecting surface, a second reflecting surface, and a third reflecting surface. The first reflecting surface can be disposed in the light emitting direction of the light source, and the first reflecting surface can reflect light emitted from the light source and reaching the first reflecting surface to a predefined illuminating direction, for forming a part of the predetermined light distribution pattern. The second reflecting surface can be disposed in the light emitting direction of the light source and out of the illuminated area of the first reflecting surface, and can reflect light emitted from the light source and reaching the second reflecting surface to the third reflecting surface. The third reflecting surface can be disposed at a position so that the light-emitting areas of the first optical system and the second optical system are observed as an integrated single light-emitting area of the optical systems, and can reflect light from the second reflecting surface to a predefined illuminating direction. The reflector can be integrally formed by the first reflecting surface, the second reflecting surface, and the third reflecting surface.

In the vehicle light according to the above aspect of the presently disclosed subject matter, the first reflecting surface, the second reflecting surface, and the third reflecting surface can be integrally formed in a single reflector. This means there is no need to assemble separate first to third reflecting surfaces with higher accuracy, and the assembly can be achieved by integrally forming them with the originally designed accuracy. Accordingly, these reflecting surfaces can be assembled in a period of time shorter than the conventional vehicle light. In addition to this, the accumulation of assembly errors during the assembling of these optical systems can be prevented.

When the above-described vehicle light is installed in a vehicle body, the first optical system can be positioned on an upper side of the vehicle light, and the second optical system can be positioned on a lower side while adjacent to the first optical system.

In the above-described vehicle light, the light source can be an LED light source.

The above-described vehicle light can further include a stay having swinging axes provided to respective ends of the stay, the swinging axes serving as a swinging center during the adjustment of an optical axis of the vehicle light, and a fixing mechanism configured to fix the stay on or near a center of gravity of the vehicle light.

When the swinging axes are clamped between extensions provided to the vehicle body, the vehicle light with the above-described configuration can be swingably supported. This mechanism can be used for optical axis adjustment of the vehicle light that includes a plurality of optical systems with the originally designed accuracy (specification).

Furthermore, the stay can be positioned on or near a center of gravity of the vehicle light. Accordingly, when the optical axis of the vehicle light is adjusted by swinging the vehicle light by means of a known optical axis adjuster, the load applied to the adjuster can be relieved. When the vehicle light is vibrated due to the travelling of a vehicle on which the vehicle light is installed, adverse effects of vibration to the vehicle light can be suppressed.

In the above-described configuration, the stay can be fixed so as to be freely attached to and detached from the vehicle light. In some cases, for example, a vehicle light can include another component added to the heat sink or other component, or a certain component can be removed from the vehicle light. In such cases, the position of center of gravity may be changed. Even in these cases, simply by changing the design of a stay, the relationship between the position of the center of gravity and the stay can be adjusted to maintain the relationship according to the originally designed specification.

In the above-described vehicle light, the predetermined light distribution pattern may be any one of a low beam light distribution pattern, a high bean light distribution pattern, and a light distribution pattern for a fog light.

According to still another aspect of the presently disclosed subject matter, a vehicle light can include, a heat sink including a heat sink body having a light source mounting portion, and a heat radiation fin, a first optical system configured to form a part of a predetermined light distribution pattern, having at least one first optical assembly to be mounted on an upper side of the light source mounting portion of the heat sink body, the first optical assembly having a first LED light source, a first reflector, and a projection lens, a second optical system configured to form a part of the predetermined light distribution pattern, having at least one second optical assembly to be mounted on a lower side of the light source mounting portion of the heat sink body, the second optical assembly having a second LED light source and a second reflector, the second reflector including a first reflecting surface, a second reflecting surface, and a third reflecting surface, wherein the first reflecting surface can be disposed in the light emitting direction of the second LED light source, and the first reflecting surface can reflect light emitted from the second LED light source and reaching the first reflecting surface to a predefined illuminating direction, for forming a part of the predetermined light distribution pattern, the second reflecting surface can be disposed in the light emitting direction of the second LED light source and out of the illuminated area of the first reflecting surface, and can reflect light emitted from the second LED light source and reaching the second reflecting surface to the third reflecting surface, the third reflecting surface can be disposed at a position so that the light-emitting areas of the first optical system and the second optical system are observed as an integrated single light-emitting area of the optical systems, and can reflect light from the second reflecting surface to a predefined illuminating direction, and the reflector can be integrally formed by the first reflecting surface, the second reflecting surface, and the third reflecting surface, and a stay disposed on or near a center of gravity of the vehicle light, having a stay body and swinging axes provided to respective ends of the stay body.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a vehicle light of the presently disclosed subject matter with reference to the accompanying drawings in accordance with exemplary embodiments.

Figure 1:
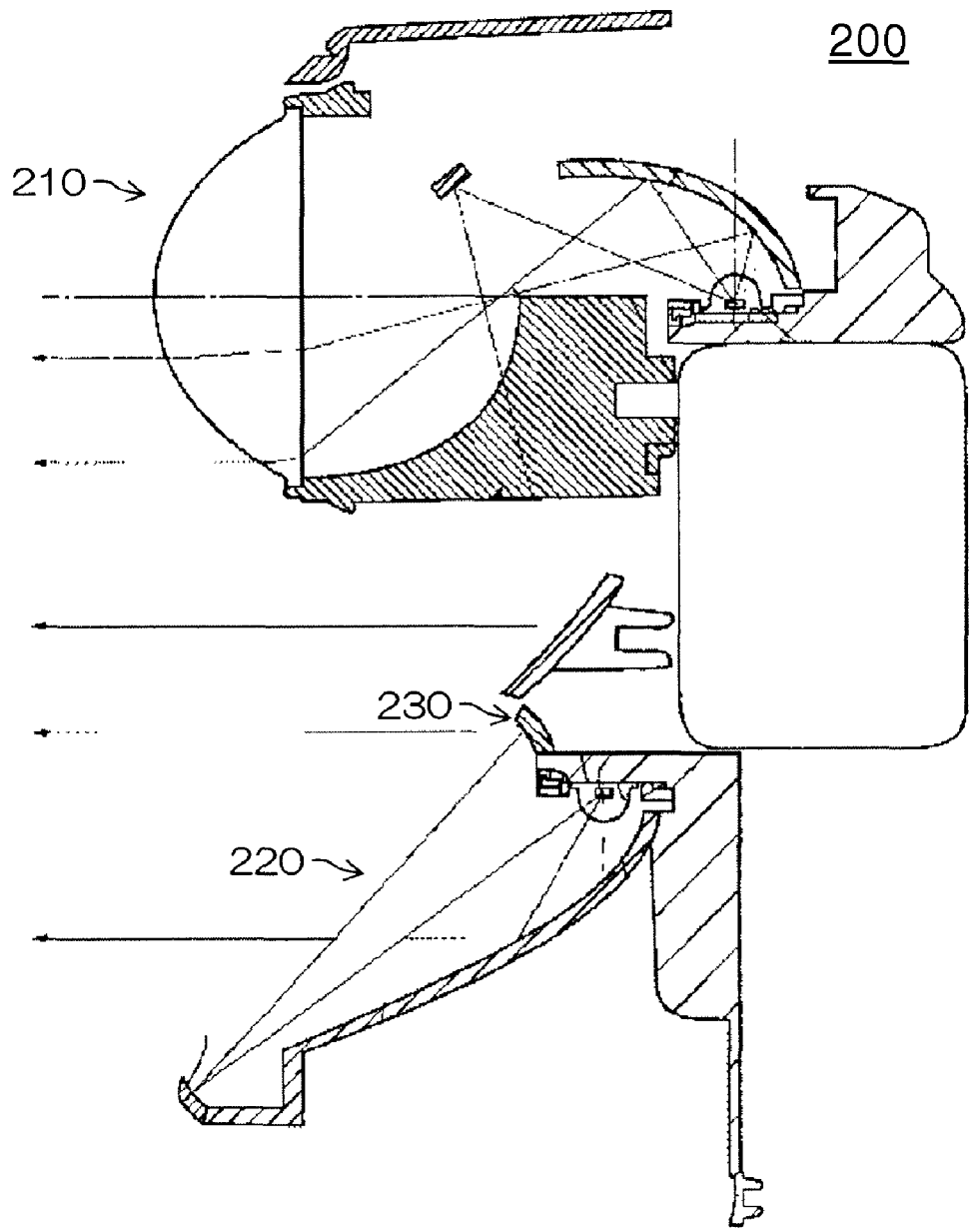
FIG. 1 is a cross-sectional view of a conventional vehicle light.
Figure 2:
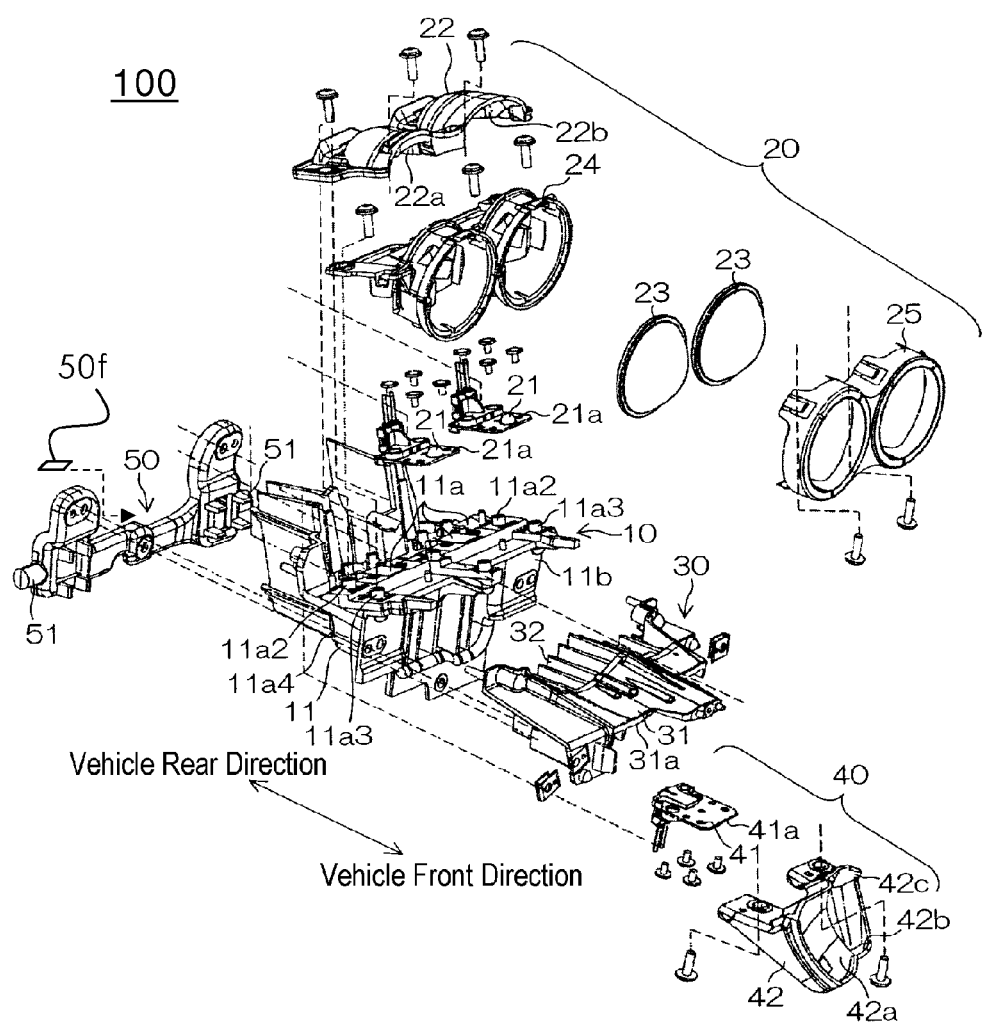
FIG. 2 is an exploded view of a vehicle light made in accordance with principles of the presently disclosed subject matter.

The vehicle light 100 of the present exemplary embodiment can be applied to a vehicle headlight, a fog light or the like for an automobile or other vehicle. As shown in FIG. 2, the vehicle light 100 can include a first heat sink 10, an upper optical system 20 (or first optical system), a second heat sink 30, a lower optical system 40 (or second optical system), and a stay 50, for example.

The first heat sink 10 can include a first heat sink body 11 disposed on the front side of a vehicle body, and a first heat radiation fin 12 disposed on the rear side of the vehicle body.

Figure 3:
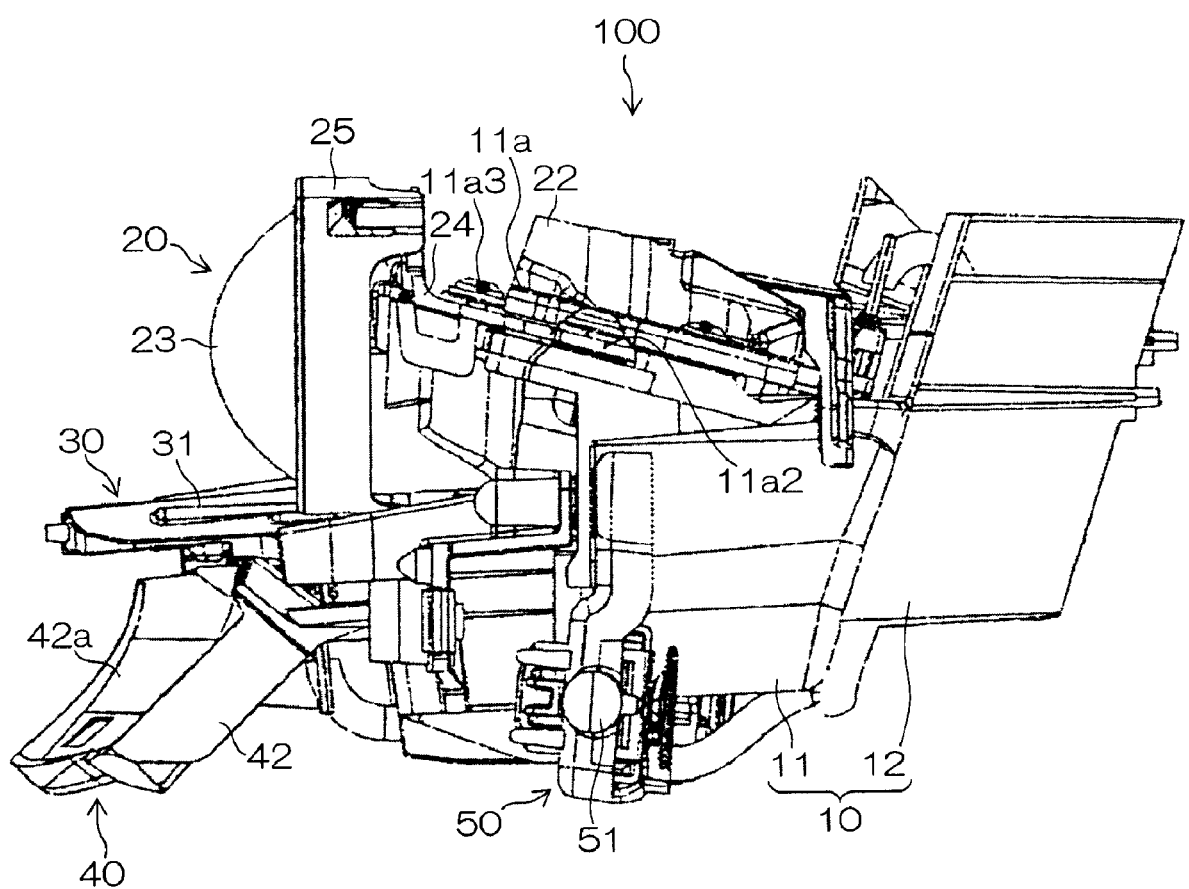
FIG. 3 is a side view of the vehicle light of FIG. 2.
Figure 4:
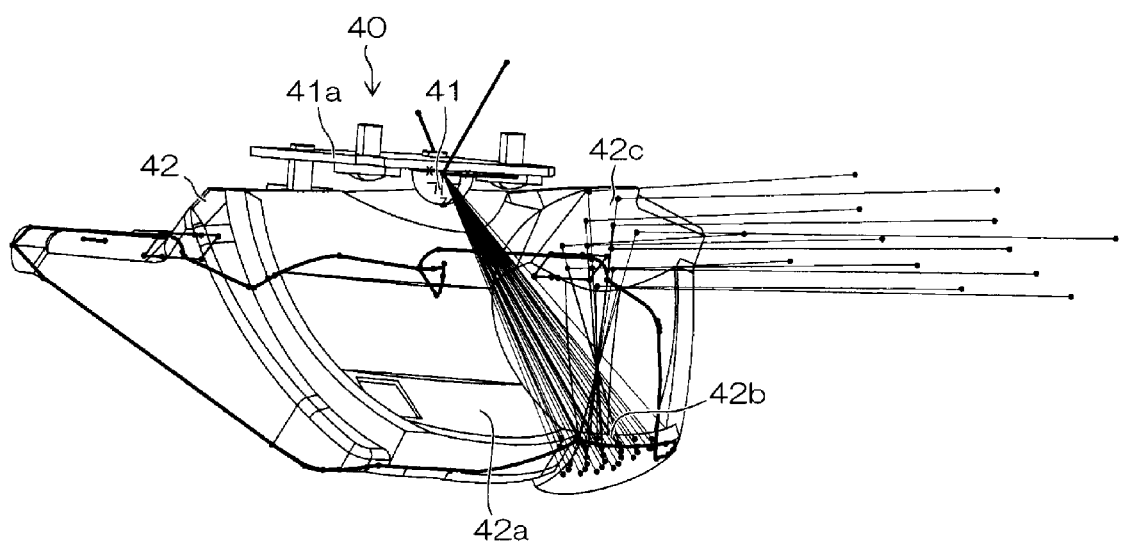
FIG. 4 is a perspective view of a lower optical system of the vehicle light of FIG. 2.

The upper optical system 20 can be a projection optical system configured to form a part of a desired light distribution pattern. As shown in FIGS. 2 and 3, the upper optical system 20 can be composed of a plurality of optical assemblies. The optical assemblies can be fixed to respective locations on the upper surface 11a of the first heat sink 10, which is inclined downward from the front side of a vehicle body to the rear side, so that the optical assemblies do not interfere with each other. In the exemplary embodiment as shown in FIGS. 2 to 5, two optical assemblies serving as the upper optical system 20 are arranged in the vehicle width direction. Each optical assembly can be composed of a first LED light source 21, a first reflector 22, a projection lens 23, a lens holder 24, a retainer 25, and the like. It should be noted that the desired light distribution pattern should satisfy the conditions of specifications required for a vehicle light, and examples thereof include a so-called low beam light distribution pattern, a high beam light distribution pattern, a light distribution pattern for a fog light (for fog weather, bad weather, and the like).

The first light source 21 can be an LED light source, for example, including a single LED chip or a plurality of LED chips that are packaged. The first light source 21 can be disposed at a predetermined rear-side position on the upper surface 11a of the first heat sink 10 and fixed by screwing so that the illumination direction of the first light source 21 is directed upward and slightly backward with respect to the vehicle body.

The first reflector 22 can be composed of reflecting surfaces 22a and 22b as shown in FIG. 2. The first reflector 22 can be positioned at a predetermined position 11a2 on the upper surface 11a of the first heat sink 10 and fixed by screws or other attachment structures, systems, or materials so that the reflecting surfaces 22a and 22b are disposed in the illumination direction of the corresponding first LED light sources 21.

The reflecting surfaces 22a and 22b can receive the light emitted from the respective first light sources 21 and reflect the same to the corresponding projection lenses 23 so that the light passing through the projection lenses 23 can form a part of a desired light distribution pattern. The reflecting surfaces 22a and 22b can be changed according to a required vehicle specification, and examples thereof include an elliptic reflecting surface, a parabolic reflecting surface, and the like. In the present exemplary embodiment, the reflecting surfaces 22a and 22b can be formed as an elliptic reflecting surface.

The projection lens 23 can be held between the lens holder 24 and the retainer 25. The lens holder 24 can be positioned at a predetermined front position 11a3 on the upper surface 11a of the first heat sink 10 and fixed by screws or the like.

As shown in FIGS. 2 and 3, the second heat sink 30 can include a second heat sink body 31 disposed on the front side of the vehicle body, and a second heat radiation fin 32 disposed on the rear side of the vehicle body. The second heat sink 30 can be fixed to the front face 11b of the first heat sink 10 by screws or the like.

The lower optical system 40 can form a part of the desired light distribution pattern. The lower optical system 40 can be composed of a plurality of optical assemblies. The optical assemblies can be fixed to respective locations on the lower surface 31a of the second heat sink body 31 so that the optical assemblies do not interfere with each other. Each optical assembly can be composed of a second light source 41 and a second reflector 42, and the like.

The second light source 41 can be an LED light source, for example, including a single LED chip or a plurality of LED chips that are packaged. The second light source 41 can be disposed at a predetermined position on the lower surface 31a of the second heat sink 30 and fixed by screws or the like so that the illumination direction of the second LED light source 41 is directed downward and slightly frontward with respect to the vehicle body.

The second reflector 42 can be composed of a first reflecting surface 42a, a second reflecting surface 42b, and a third reflecting surface 42c as shown in FIG. 2 to FIG. 5. The second reflector 42 can be formed by, for example, injecting a resin material to form a reflector base, and subjecting the reflector base to mirror treatment (aluminum deposition or the like), so that the reflecting surfaces can be integrally and simultaneously formed. The second reflector 42 can be positioned at a predetermined position on the lower surface 31a of the second heat sink body 31 and fixed by screws or the like so that the first reflecting surfaces 42 and the second reflecting surface 42b are disposed in the illumination direction of the second LED light source 41.

The first reflecting surface 42a can be configured to reflect light that is emitted from the second light source 41 and that reaches the first reflecting surface 42a to a predefined illumination direction so as to form a part of the desired light distribution pattern. The first reflecting surface 42a can be formed by a parabolic reflecting surface, an elliptic reflecting surface, or the like in accordance with the vehicle light specifications. In the present exemplary embodiment, the first reflecting surface 42a is formed as a parabolic reflecting surface.

The second reflecting surface 42b can be disposed in the light emitting direction of the second light source 41 and out of the illuminated area of the first reflecting surface 42a by the second light source 41. In the present exemplary embodiment, the second reflecting surface 42b is formed to extend from the lower end of the first reflecting surface 42a (see FIGS. 4 and 5). Furthermore, the second reflecting surface 42b can be configured to reflect light that is emitted from the second light source 41 and that reaches the second reflecting surface 42b to the third reflecting surface 42c. In the present exemplary embodiment, the second reflecting surface 42b is formed as an elliptic reflecting surface. The elliptic second reflecting surface 42b can have a first focal point on or near the second light source 41 and a second focal point disposed between the second reflecting surface 42b and the third reflecting surface 42c.

The third reflecting surface 42c can be disposed at a certain position so that the light-emitting areas of the upper optical system 20 and the adjacent lower optical system 40 can be observed as an integrated single light-emitting area of the optical systems. In the present exemplary embodiment, the third reflecting surface 42c is disposed near the boundary between the upper optical system 20 and the lower optical system 40. The third reflecting surface 42c can reflect light from the second reflecting surface 42b to a predefined illuminating direction. In the present exemplary embodiment, the third reflecting surface 42c is a parabolic reflecting surface, and disposed sideward from the second light source 41 and near the upper end of the first reflecting surface 42a.

Figure 5:
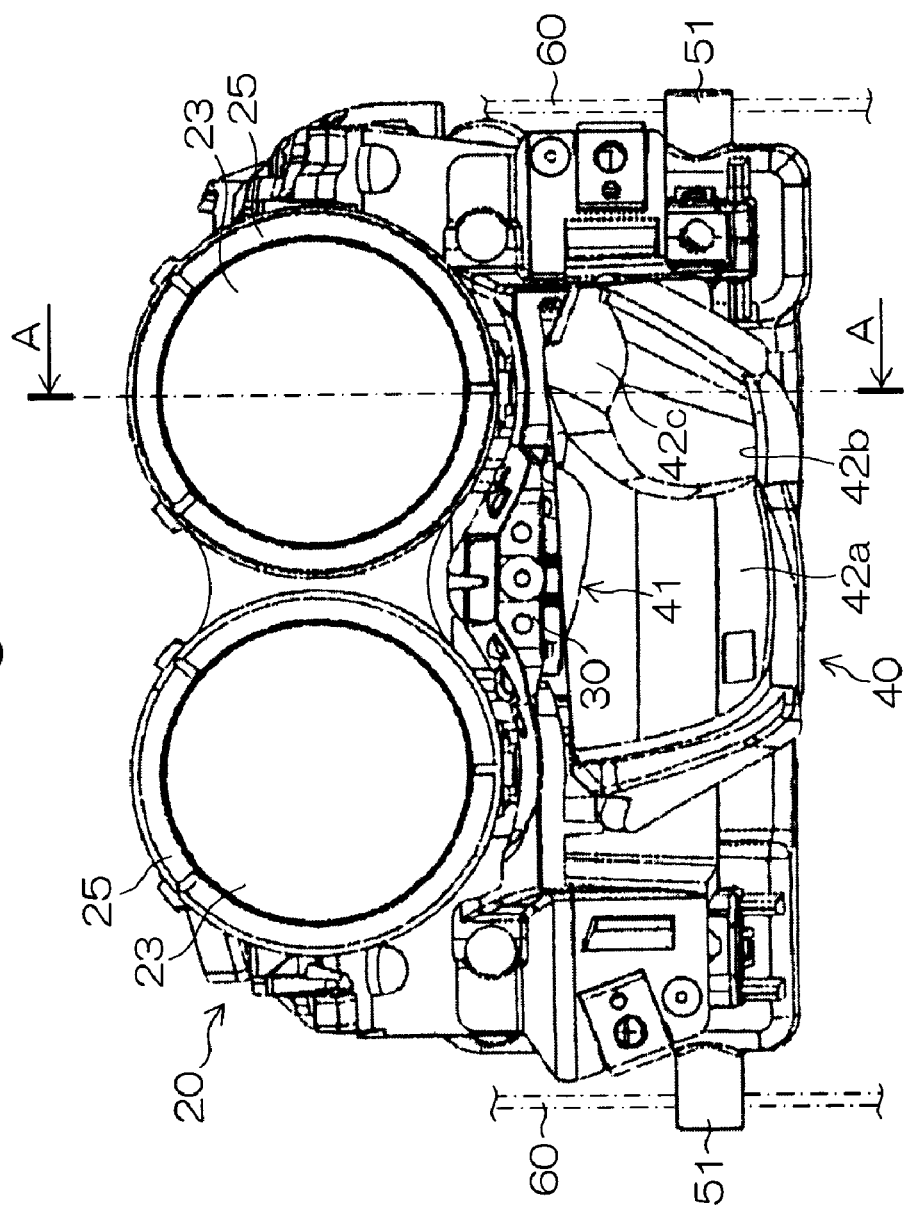
FIG. 5 is a front view of the vehicle light of FIG. 2.

As shown in FIGS. 2 and 3, the stay 50 can be fixed on or near a center of gravity of the vehicle light 100 by a fixing mechanism 50f such as screws or the like so as to be detachable. In the present exemplary embodiment, the stay 50 is disposed below the first heat sink body 11. The stay 50 (or stay body) can have swinging axes 51 provided at respective ends of the stay 50. The swinging axes 51 can serve as a swinging center during optical axis adjustment. The swinging axes can be clamped between extensions 60 provided on a vehicle body as shown in FIG. 5, whereby the vehicle light 100 with the above-described configuration can be supported while being swingable around the swinging axes in the front and rear directions. This configuration can be used for optical axis adjustment of the vehicle light 100. Namely, this configuration can be used for simultaneous optical axis adjustment of the vehicle light 100 that is formed by assembling a plurality of optical systems with the originally designed accuracy (specification).

As described above, according to the present exemplary embodiment, the first reflecting surface 42a, the second reflecting surface 42b, and the third reflecting surface 42c can be integrally formed into the very same reflector, or the second reflector 42. Accordingly, there is no need to separately assemble three reflecting surfaces with high accuracy. Instead, the first reflecting surface 42a to the third reflecting surface 42c can be integrally and simultaneously formed into a single reflector with the originally designed accuracy. Furthermore, the first reflecting surface 42a, the second reflecting surface 42b, and the third reflecting surface 42c can be assembled in a period of time that can be shorter than the time required for a conventional vehicle light. In addition to this, the accumulation of assembly errors during the assembling of the first reflecting surface 42a and assembly errors during the assembling of the second reflecting surface 42b and the third reflecting surface 42c can be prevented.

Furthermore, according to the present exemplary embodiment, the stay 50 can be positioned on or near a center of gravity of the vehicle light 100. Accordingly, when the optical axis of the vehicle light 100 is adjusted by swinging the vehicle light 100 by means of a known optical axis adjuster (not shown), the load applied to the adjuster can be relieved. Furthermore, when the vehicle light 100 is vibrated due to the travelling of a vehicle on which the vehicle light 100 is installed, adverse effects of vibration to the vehicle light 100 can be suppressed.

In the present exemplary embodiment, the stay 50 can be fixed so as to be freely attached to and detached from the vehicle light 100. However, in certain cases the vehicle light 100 can include another component added to the first heat sink 10 or other structure, or a certain component can be removed from the vehicle light 100. In this case, the position of the center of gravity may be changed. Even in this case, simply by changing the design of stay 50, the relationship between the position of center of gravity and the stay 50 (or the swinging axes 51) can be adjusted to the relationship according to the originally designed specification.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle light comprising:
  a first optical system configured to form a part of a predetermined light distribution pattern, the first optical system having a light-emitting area when observed from outside;
  a second optical system disposed adjacent to the first optical system and configured to form a part of the predetermined light distribution pattern, the second optical system having a light-emitting area when observed from outside, the second optical system including a light source having a light emitting direction, and a reflector including a first reflecting surface, a second reflecting surface, and a third reflecting surface;
  a stay having swinging axes provided at respective ends of the stay, the swinging axes serving as a swinging center during adjustment of an optical axis of the vehicle light; and
  a fixing mechanism configured to fix the stay substantially at a center of gravity of the vehicle light, wherein
  the first reflecting surface is disposed in the light emitting direction of the light source so that the first reflecting surface reflects light emitted from the light source to a predefined illuminating direction, thereby forming an illuminated area of the first reflecting surface and a part of the predetermined light distribution pattern,
  the second reflecting surface is disposed in the light emitting direction of the light source and out of the illuminated area of the first reflecting surface, so that the second reflecting surface reflects light emitted from the light source to the third reflecting surface,
  the third reflecting surface is disposed at a position so that the light-emitting areas of the first optical system and the second optical system are observed as an integrated single light-emitting area of both the first optical system and second optical system, and the third reflecting surface is configured to reflect light from the second reflecting surface to a predefined illuminating direction, and
  the reflector is integrally formed such that the first reflecting surface, the second reflecting surface, and the third reflecting surface are a single continuous integral surface.

2. The vehicle light according to claim 1, wherein the first optical system is positioned on an upper side of the vehicle light, and the second optical system is positioned on a lower side of the vehicle light while adjacent to the first optical system.

3. The vehicle light according to claim 1, wherein the light source is an LED light source.

4. The vehicle light according to claim 2, wherein the light source is an LED light source.

5. The vehicle light according to claim 1, wherein the predetermined light distribution pattern is any one of a low beam light distribution pattern, a high bean light distribution pattern, and a light distribution pattern for a fog light.

6. The vehicle light according to claim 2, wherein the predetermined light distribution pattern is any one of a low beam light distribution pattern, a high bean light distribution pattern, and a light distribution pattern for a fog light.

7. The vehicle light according to claim 3, wherein the predetermined light distribution pattern is any one of a low beam light distribution pattern, a high bean light distribution pattern, and a light distribution pattern for a fog light.

8. The vehicle light according to claim 4, wherein the predetermined light distribution pattern is any one of a low beam light distribution pattern, a high bean light distribution pattern, and a light distribution pattern for a fog light.

9. A light comprising:
  a heat sink including a heat sink body having a light source mounting portion, and a heat radiation fin;
  a first optical system configured to form a part of a predetermined light distribution pattern, having at least one first optical assembly configured to be mounted on an upper side of the light source mounting portion of the heat sink body, the first optical assembly having a first LED light source, a first reflector, and a projection lens;
  a second optical system configured to form a part of the predetermined light distribution pattern, having at least one second optical assembly configured to be mounted on a lower side of the light source mounting portion of the heat sink body, the second optical assembly having a second LED light source and a second reflector, the second reflector including a first reflecting surface, a second reflecting surface, and a third reflecting surface, wherein
  the first reflecting surface is disposed in the light emitting direction of the second LED light source, so that the first reflecting surface reflects light emitted from the second LED light source to a predefined illuminating direction, thereby forming an illuminated area of the first reflecting surface and a part of the predetermined light distribution pattern,
  the second reflecting surface is disposed in the light emitting direction of the second LED light source and out of the illuminated area of the first reflecting surface, so that the second reflecting surface reflects light emitted from the second LED light source to the third reflecting surface,
  the third reflecting surface is disposed at a position so that light-emitting areas of the first optical system and the second optical system are observed as an integrated single light-emitting area of the first optical system and second optical system, and the third reflecting surface is configured to reflect light from the second reflecting surface to a predefined illuminating direction, and
  the reflector is integrally formed such that the first reflecting surface, the second reflecting surface, and the third reflecting surface are a single continuous integral surface; and
  a stay disposed substantially at a center of gravity of the vehicle light, the stay having a stay body and swinging axes provided at respective ends of the stay body.

10. The light of claim 9 further comprising:
  a fixing mechanism configured to fix the stay substantially at a center of gravity of the light.

11. The light according to claim 9, wherein the predetermined light distribution pattern is any one of a low beam light distribution pattern for a vehicle, a high bean light distribution pattern for a vehicle, and a light distribution pattern for a fog light for a vehicle.

* * * * *